US009327196B2

(12) United States Patent
Sproule et al.

(10) Patent No.: US 9,327,196 B2
(45) Date of Patent: *May 3, 2016

(54) FEED SURFACING

(71) Applicant: Zynga Inc., San Francisco, CA (US)

(72) Inventors: Dylan Sproule, San Francisco, CA (US); Timothy J. O. Catlin, San Mateo, CA (US); Jason Paul Allen, Seattle, WA (US); Clayton Rhodes Stark, Victoria (CA); Shane Hall, San Francisco, CA (US); Ben Hall, Fairfield, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,050

(22) Filed: Jul. 18, 2014

(65) Prior Publication Data
US 2014/0329606 A1 Nov. 6, 2014

Related U.S. Application Data

(63) Continuation of application No. 13/782,015, filed on Mar. 1, 2013, now Pat. No. 8,784,204.

(60) Provisional application No. 61/605,740, filed on Mar. 1, 2012.

(51) Int. Cl.
A63F 13/30 (2014.01)
A63F 13/87 (2014.01)
A63F 13/795 (2014.01)
A63F 13/5375 (2014.01)
A63F 13/335 (2014.01)

(52) U.S. Cl.
CPC ............... *A63F 13/12* (2013.01); *A63F 13/335* (2014.09); *A63F 13/5375* (2014.09); *A63F 13/795* (2014.09); *A63F 13/87* (2014.09)

(58) Field of Classification Search
CPC ....................................................... A63F 13/12
USPC .......................................... 463/31; 705/14.12
See application file for complete search history.

(56) References Cited

U.S. PATENT DOCUMENTS

| 8,784,204 | B2 | 7/2014 | Sproule et al. |
| 2006/0135264 | A1 | 6/2006 | Shaw et al. |

(Continued)

OTHER PUBLICATIONS

"Candy Crush Saga", [Online]. Retrieved from the Internet: <https://developers.facebook.com /docs/showcase/candycrushsaga/>, 2 pgs.

(Continued)

*Primary Examiner* — Jason Skaarup
(74) *Attorney, Agent, or Firm* — Schwegman Lundberg & Woessner, P.A.

(57) ABSTRACT

A system, computer-readable storage medium storing at least one program, and a computer-implemented method are provided for displaying feed-based information in an online game. Player feeds are received in a game networking system. A specification for displaying information from the player feeds in the game networking system is accessed. A first player profile is accessed for a first player in an online game, the first player profile identifying one or more characteristics of the first player. The first-player profile is used with the specification to determine a first display profile for displaying information from the player feeds to the first player. The feed-based information is generated for the first player by using the first display profile to access the player feeds, and the feed-based information is then displayed to the first player through a user interface of the online game.

20 Claims, 8 Drawing Sheets

(56) References Cited

U.S. PATENT DOCUMENTS

| | | | |
|---|---|---|---|
| 2007/0207846 A1* | 9/2007 | Burak et al. | 463/9 |
| 2008/0040673 A1 | 2/2008 | Zuckerberg et al. | |
| 2008/0134040 A1* | 6/2008 | Pennington et al. | 715/733 |
| 2008/0227553 A1 | 9/2008 | Leifenberg et al. | |
| 2009/0193097 A1* | 7/2009 | Gassewitz et al. | 709/218 |
| 2010/0216553 A1 | 8/2010 | Chudley et al. | |
| 2012/0302206 A1 | 11/2012 | Vock et al. | |
| 2013/0095857 A1 | 4/2013 | Garcia et al. | |
| 2013/0231181 A1 | 9/2013 | Sproule et al. | |

OTHER PUBLICATIONS

"Feed Description", Published by Facebook and [Online] retrieved from the internet: <https://developers.facebook.com/docs/games/feed/>, 6 pgs.

"Filtering Games News Feed", [Online] retrieved from the internet: <http://www.facebook.com/note.php?note_id=305847217534>, (Feb. 16, 2010), 4 pgs.

"IOS Games Tutorial", [Online]. Retrieved from the Internet: <https://developers.facebook.com /docs/ios/ios-sdk-games>, 44 pgs.

"RSS—Rich Site Summary", Wikipedia, [Online]. Retrieved from the Internet: <URL: http://en.wikipedia.org/wiki/RSS>, (Accessed May 31, 2013), 7 pgs.

"Web feed", Wikipedia, [Online]. Retrieved from the Internet: <URL: http://en.wikipedia.org/wiki/Web_feed>, (Accessed May 31, 2013), 3 pgs.

Collins, Will, "Game Spotlight: Candy Crush Saga", [Online]. Retrieved from the Internet: <https://developers.facebook.com /blog/post/2012/06/15/game-spotlight--candy-crush-saga/,>, (Jun. 15, 2015), 4 pgs.

* cited by examiner

FEED SURFACING

CROSS-REFERENCE TO RELATED APPLICATIONS

This application is a continuation of U.S. patent application Ser. No. 13/782,015, filed on Mar. 1, 2013, and issued as U.S. Pat. No. 8,784,204 on Jul. 22, 2014, which claims the benefit of U.S. Provisional Application No. 61/605,740, filed Mar. 1, 2012, the benefit of priority of each of which is claimed hereby, and each of which are incorporated by reference herein in its entirety.

BACKGROUND

The present disclosure relates to games and applications in general and in particular to computer-implemented games. A user's access to player feeds corresponding to other players can enrich the gaming experience. However, the identification and availably of relevant player feeds may be inaccessible to the user depending on the operational setting.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Player feeds can be received and displayed to individual players with delays that are small relative to the play of the game to provide a real-time experience to game participants. Player feeds are received in a game networking system. A specification for displaying information from the player feeds in the game networking system is accessed. A first player profile is accessed for a first player in an online game, the first player profile identifying one or more characteristics of the first player. The first-player profile is used with the specification to determine a first display profile for displaying information from the player feeds to the first player. The feed-based information is generated for the first player by using the first display profile to access the player feeds, and the feed-based information is then displayed to the first player through a user interface of the online game.

Example System

Figure 1:
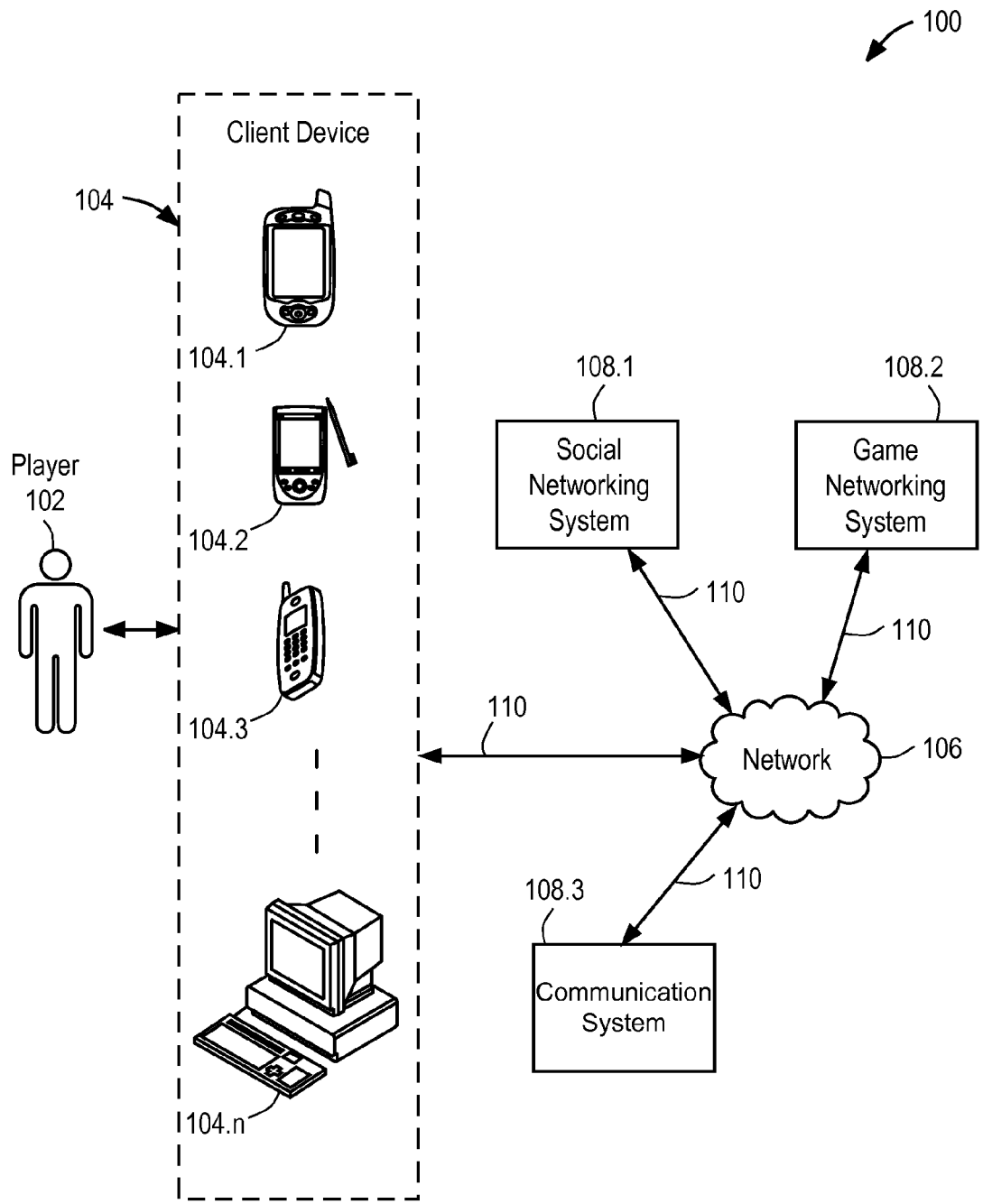
FIG. 1 is a schematic diagram showing an example of a system, according to some embodiments.

FIG. 1 is a schematic diagram showing an example of a system 100 for implementing various example embodiments. In some embodiments, the system 100 comprises a player 102, a client device 104, a network 106, a social networking system 108.1, a game networking system 108.2, and a communication system 108.3. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, or any other type of network, or a combination of two or more such networks.

The client device 104 may be any suitable computing device (e.g., devices 104.1-104.$n$), such as a smart phone 104.1, a personal digital assistant 104.2, a mobile phone 104.3, a personal computer 104.$n$, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the game networking system 108.2 may include an introduction mechanic that can introduce a player 102 of the game networking system 108.2 to other players 102 of the game networking system 108.2 that are encountering a common in-game obstacle.

Moreover, the communication system 108.3 may include a network-addressable computing system (or systems) that can coordinate communication between players 102 linked by the one or more social graphs hosted by the social networking system 108.1. The communication system 108.3 may provide access to various systems in order to facilitate communication between players 102 across a plurality of games hosted by the game network system 108.2. The communication system 108.3 may further provide a player 102 with the ability to give game-related assets to other players 102, as well as receive game-related assets from other players 102. The ability to give and receive game-related assets may be performed via a chat user interface, which provides a player 102 with a user interface for communicating with other players 102 and initiating transfers of game-related assets.

Although FIG. 1 illustrates a particular example of the arrangement of the player 102, the client device 104, the social networking system 108.1, the game networking system 108.2, the communication system 108.3, and the network 106, this disclosure includes any suitable arrangement or configuration of the player 102, the client device 104, the social networking system 108.1, the game networking system 108.2, the communication system 108.3, and the network 106.

Figure 2:
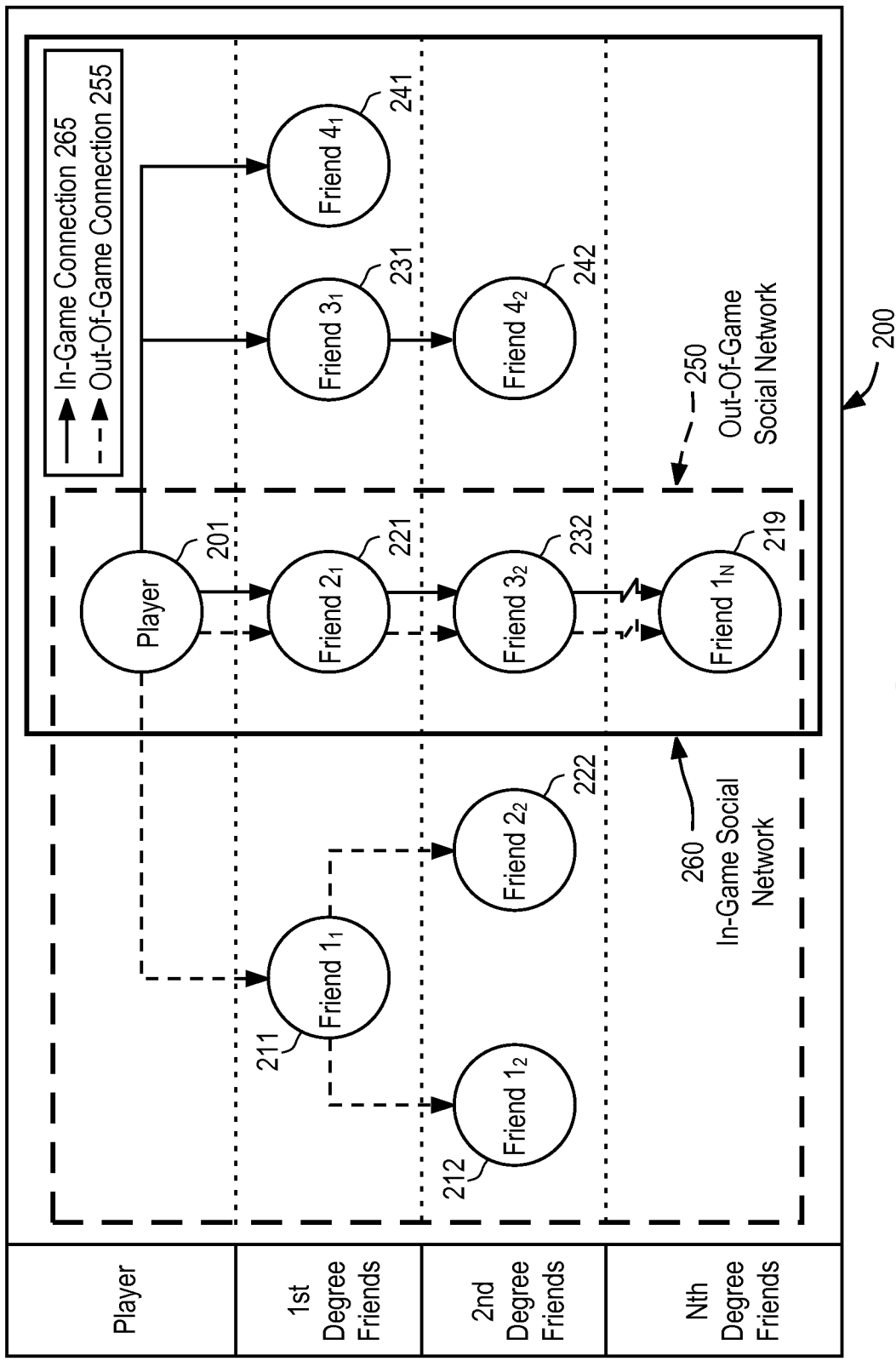
FIG. 2 is a schematic diagram showing an example of a social network within a social graph, according to some embodiments.

FIG. 2 is a schematic diagram showing an example of a social network within a social graph 200. The social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with one or more virtual games. In an example embodiment, each player may communicate with other players. When, for example, Player 201 initiates a transfer of a game-related asset to Friend 231, the communication system may perform the transfer of the game-related asset from Player 201 to Friend 231.

Example Player-Feed Display

In a variety of web-based settings, content can be updated and displayed automatically through the use of web feeds including RSS (Really Simple Syndication) feeds. For example, after a content distributor syndicates a web feed, users can then subscribe to that web feed and access it through a viewer or reader (e.g., a conventional web browser). Typically a web feed corresponds to an XML-based document that includes at least one web link to the source of the content (e.g., blogs, top-ten lists, weather reports). Conventional formats for web feeds include RSS and atom. A collection of web feeds can be made accessible in one location though an aggregator.

In a gaming context, a player feed (or game feed) can provide visibility into another player's game activities including ratings, prior moves, assets, and blogs. Preferably the player feeds are Real-Time Streams (RTS) that are able to provide current information for decision-making in a gaming context. Although delays are inevitable in any physical system, the process can appear to be a real-time system when the delays are small relative to the play of the game. For example, if the feeds are accessed within seconds (or minutes) and correspondingly displayed within seconds (or minutes) the gaming experience can still be perceived as information flowing in real time.

The selective display of these player feeds, also known as feed surfacing, may depend on player permissions as well as system rules. For example, a player 102 may only want certain information to be made available to other players depending on alliances and network relationships (e.g., network friends).

In some operational settings, it may be desirable to display player information from a first player's feed to a second player, who may be unknown to the first player (e.g., with no network relationships or with only indirect network relationships). Sharing information between unknown players may promote additional gaming activity including alliances in a current game or in future games. Player feeds may be shared between players in a single instantiation of a game, in different instantiations of the same game, or in different instantiations of different games. For example, two players with similar playing styles and demographic backgrounds may be introduced through a selective display of player feeds.

At a given player's user screen, the display of the player feeds from other players may be organized into separate informational units based on the nature of the game, the details of the communication or other information, the identity of the given player, and the identities of the other players. For example, in certain role-playing games that do not progress incrementally in turns there may be a separate classification for communications directed to real-time strategies such as proposals for acquiring or maneuvering assets (e.g., offers to help or requests for help). A helper log may be used to identify players that have helped the given player in the past. Another helper log may also identify which players have been helped in the past by the given player. Additional fields may be directed to general communications (e.g., chat) between players and to high-priority communications (e.g., Alerts).

In some operational settings there may be thousands or even millions of players actively engaged in an online game. The user interface may include menu options that enable each player to selectively drill down into the display criteria for the player feeds in order to display information that is currently most relevant.

Figure 3:
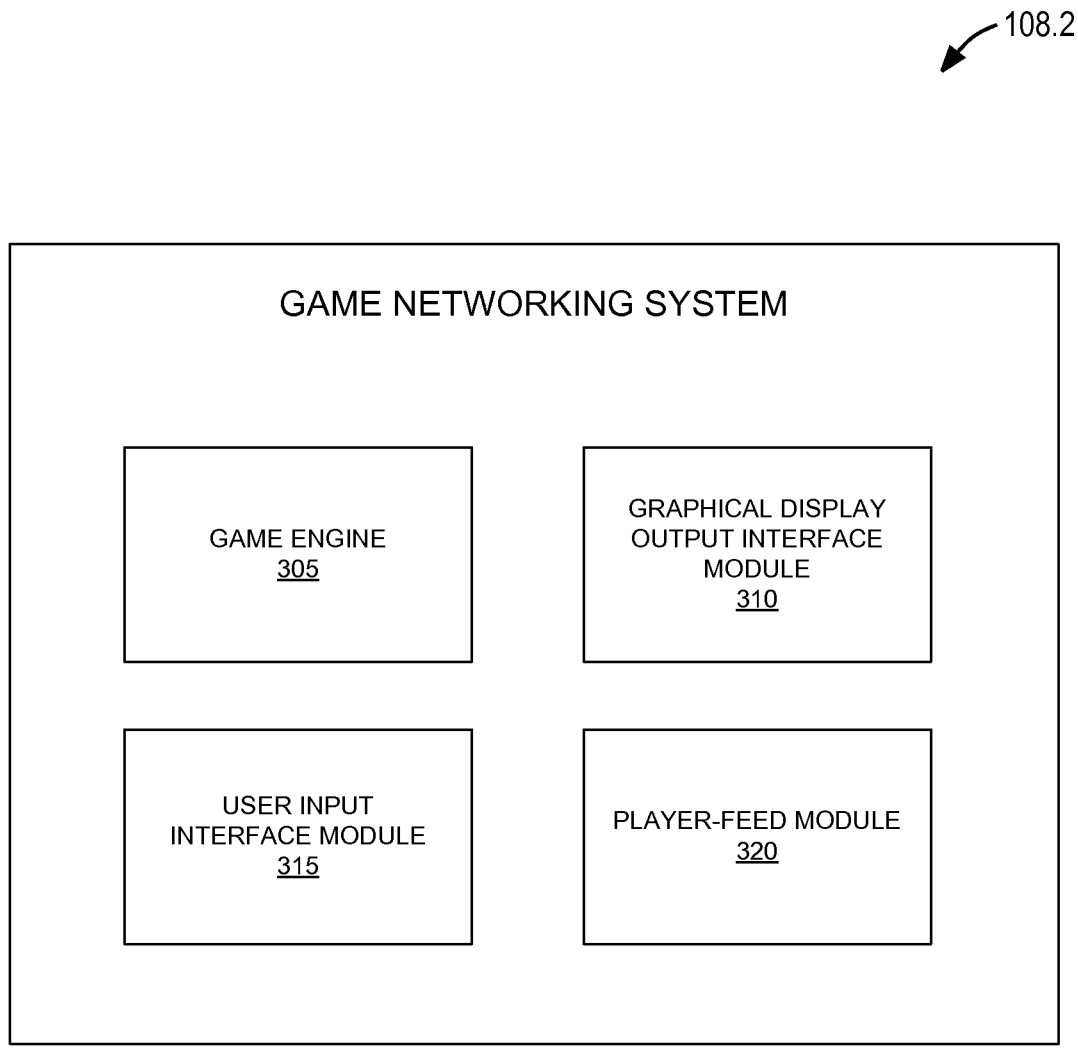
FIG. 3 is a block diagram showing example components of a game networking system, according to some embodiments.

FIG. 3 is a block diagram showing example components of a game networking system 108.2. Game networking system 108.2 may include a game engine 305, a graphical user display output interface module 310, a user input interface module 315, and a player-feed module 320.

The game engine 305 may be a hardware-implemented module which may control any aspects of a game based on rules of the game, including how a game is played, players' actions and responses to players' actions, etc. The game engine 305 may be configured to generate a game instance of a game of a player 102 and may determine the progression of a game based on user inputs and rules of the game.

The graphical user display output interface module 310 may be a hardware-implemented module that controls information or data that is provided to client systems for display on a client device 104. For example, the graphical user display output interface module 310 may be configured to provide display data associated with displaying a game instance of a game, displaying the moves from a previous game of a player 102, etc.

The user input interface module 315 may be a hardware-implemented module that receives user inputs for processing by the game engine 305 based on rules of the game. For example, the user input interface module 315 may receive user inputs indicating functions, such as a move made by a player 102, a request from a player 102 to challenge another player 102, etc.

The player-feed module 320 may be a hardware-implemented module that provides functionality associated displaying feed-based information as discussed below (e.g., with respect to FIG. 5). In some embodiments, the functionality provided by the player-feed module 320 may be provided when the game is configured by a game developer such that the game runs as a competitive application. In some embodiments, the functionality provided by the player-feed module 320 may be provided via a set of APIs in a library associated with presenting a game in the challenge mode, which may be initialized by the game engine 305. In some embodiments, the library with the set of APIs may be provided as part of a Software Development Kit (SDK) for a game developer developing a game to be played via the game networking system 108.2. The SDK may be in any format that may be useful for developing games (e.g., a JavaScript library).

Figure 4A:
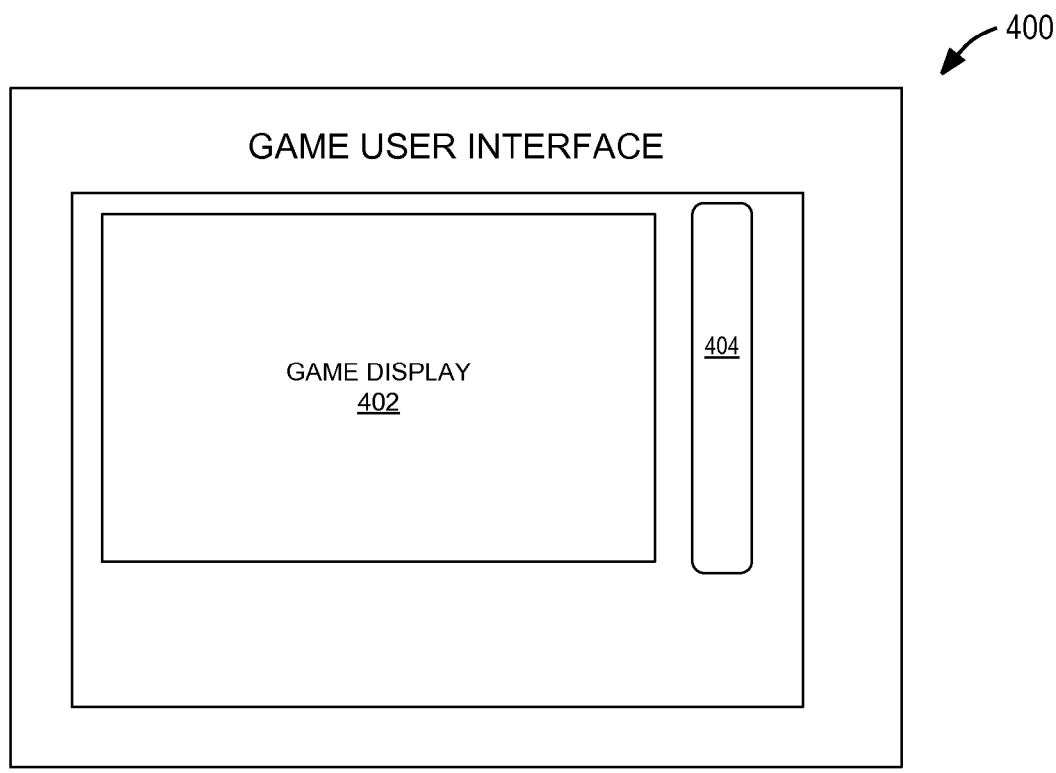
FIG. 4A is an interface diagram illustrating an example game user interface displaying a game of a player, according to some embodiments.

FIG. 4A is an interface diagram illustrating an example game user interface 400 displaying a game of a player 102. The game user interface 400 may include a game display 402 for displaying the game to the player (e.g., Player A). The game display 402 may also include a player-feed display 404 that displays real-time streams associated with the game. In some embodiments the player may generate additional player-feed displays that are directed to specific player feeds or specific game-related information in player feeds.

Figure 4B:
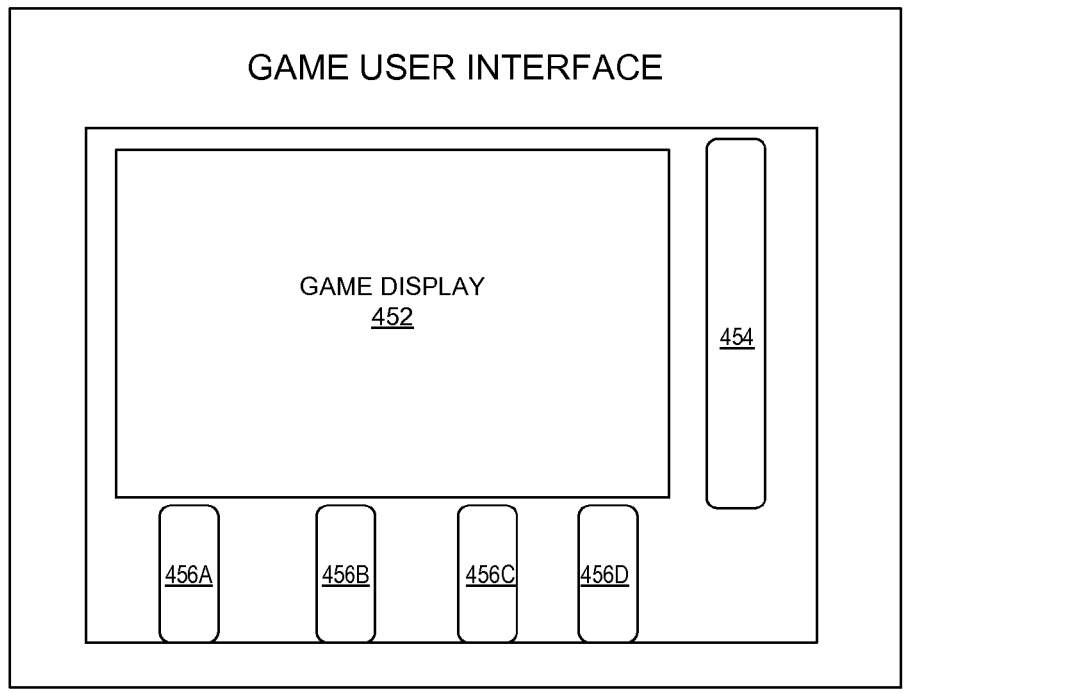
FIG. 4B is an interface diagram illustrating an example game user interface displaying feed-based information to a first player, according to some embodiments.

FIG. 4B is an interface diagram illustrating another example game user interface 450 displaying a game of a player 102. The game user interface 450 may include a game display 452 for displaying the game to the player (e.g., Player A). The game display 452 may also include a player-feed display 454 that displays real-time streams associated with the game as in FIG. 4A. According to the embodiment of FIG. 4B, the player may generate additional player-feed displays 456A-456D (e.g., by screen inputs directed to the original player-feed display 454). These additional player-feed displays 456A-456D may target specific player feeds or specific game-related information in player feeds.

Figure 4C:
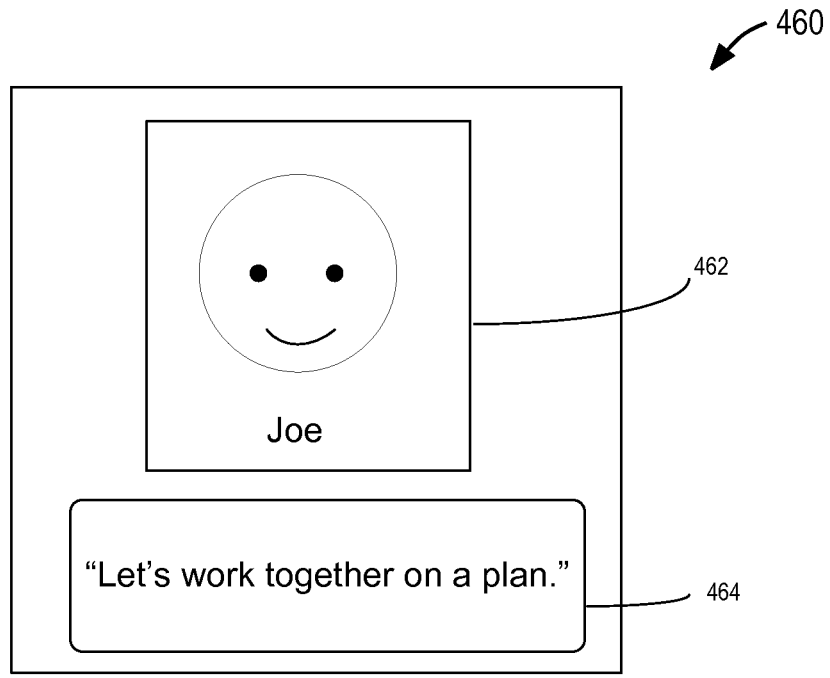
FIG. 4C is an interface diagram illustrating an example game user interface displaying feed-based information to a first player, according to some embodiments.
Figure 4D:
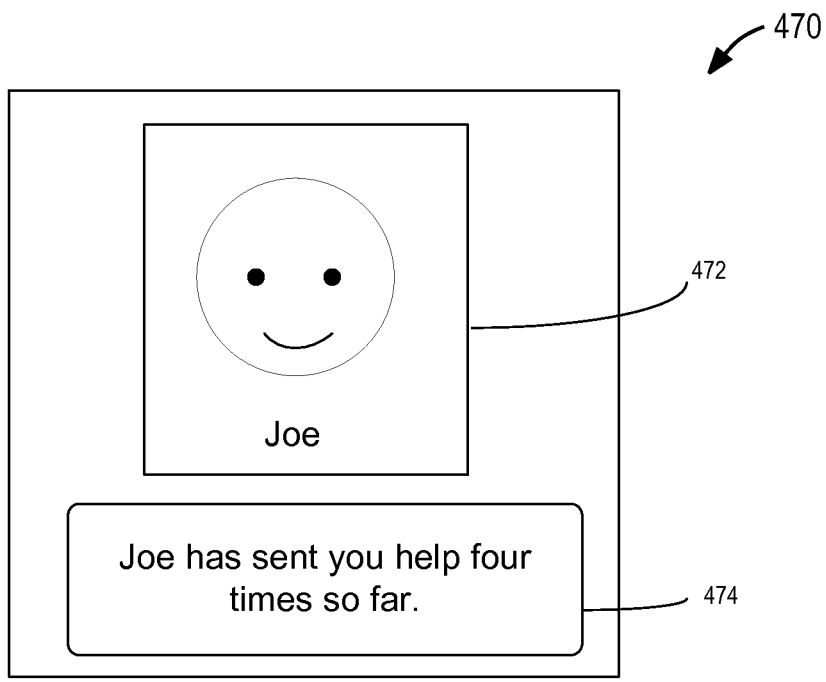
FIG. 4D is an interface diagram illustrating an example game user interface displaying feed-based information to a first player, according to some embodiments.

These feed-displays 404, 454, 456A-456D may include a variety of information related to real-time streams associated with the game (or related network traffic). For example, FIG. 4C is an interface diagram that shows a game user interface 460 that may be included in any one of the above-described feed displays 404, 454, 456A-456D. The game user interface 460 includes a player identifier 462 (e.g., including a name and an image) and a message 464 from the identified player ("Joe") directed to the player (e.g., player A) regarding possible cooperation (e.g., "Let's work together on a plan."). Similarly, FIG. 4D is an interface diagram that shows another game user interface 470 that may be included in any one of the above-described feed displays 404, 454, 456A-456D. The game user interface 470 shows a portion of a helper log that identifies help given the player (e.g., player A), where this helper log includes a player identifier 472 and log 474 of help given in a game or family of games (e.g., "Joe has sent you help four times so far."). Although these examples show textual representations of the message 464 and the log 474, other formats may be used including combinations of image data and audio data. Likewise, alternative formats and combinations of formats may be used for the player identifier 462. As discussed above, certain feed displays 456A-456D may be dynamically created in the course of the game. For example, when the player understands that help has been received from another player (e.g., from the game user interface 470 of FIG. 4D), the player may wish to instantiate a feed display to communicate with that player (e.g., as in the game user interface 460 of FIG. 4C).

Figure 5:
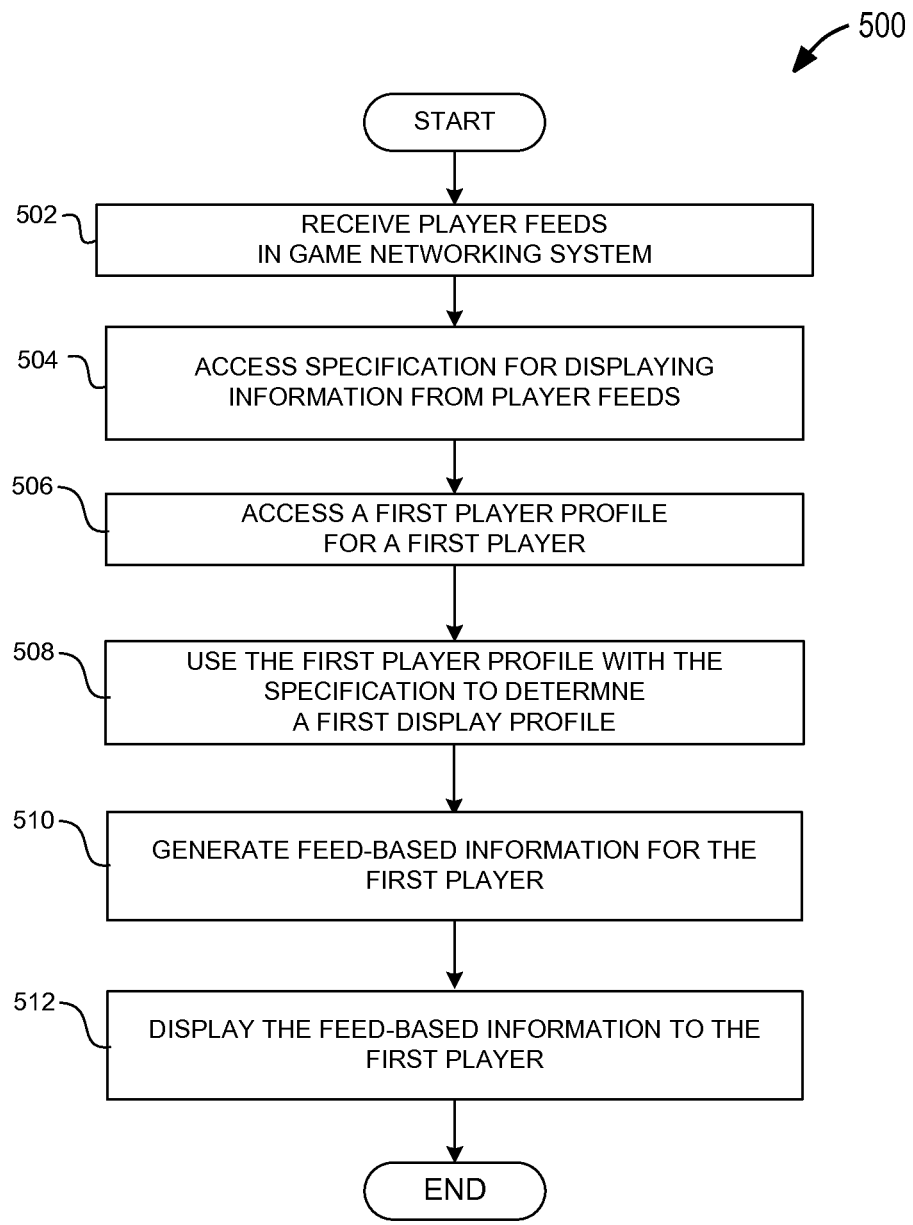
FIG. 5 is a flowchart showing an example method of displaying a game challenge between a first and second player, according to some embodiments.

FIG. 5 is a flowchart showing an example method 500 of displaying feed-based information in an online game. In a first operation 502, player feeds are received at the player-feed module 320, which may be part of a game networking system that includes the online game. In a second operation 504, a specification for displaying information from the player feeds in the game networking system 108.2 is accessed at the player-feed module 320. In a third operation 506, a first player profile for a first player in an online game is accessed at the player-feed module 320, where the first player profile identifies one or more characteristics of the first player (e.g., identity, demographics, history, ratings). In a fourth operation 508, the first-player profile is used with the specification at the player-feed module 320 to determine a first display profile for displaying information from the player feeds to the first player. In a fifth operation 510, the feed-based information is generated for the first player by using the first display profile to access the player feeds. In an optional sixth operation 512, the feed-based information is displayed to the first player by the graphical display output interface module 310 through a user interface of the online game.

The update rate for accessing and displaying player feeds may depend on the operational setting (e.g., less than a second, every few seconds or every few minutes). In some embodiments, the player feeds are real-time streams that are accessed with delays that are relatively small with respect to the online game, and the feed-based information is displayed to the first player with additional delays that are relatively small with respect to the online game.

Typically receiving the player feeds includes accessing network addresses that locate communications from the players in the game networking system 108.2. For example, an XML document may be used to access the network addresses.

The specification may include criteria that relate an identity of the first player to one or more identities of players corresponding to the player feeds so that the criteria can then be used to include selected portions of the player feeds in the feed-based information displayed to the first player. The displayed feed-based information may include specific fields for different information including chat communications directed to a real-time proposal between the first player and another player, a helper log that identifies help supplied between the first player and another player, and chat communications between the first player and another player.

As discussed above and shown in FIG. 4B, the first player may optionally request additional player-feed displays that are directed to specific player-feed data (e.g., a helper log). In a seventh operation (not shown) of the method 500, a display request is received at the player-feed module 320 from the first player to provide additional feed-based information that corresponds to the display request. In an eighth operation (not shown) of the method 500, the additional feed-based information is generated for the first player by using the first display profile and the display request to access the player feeds. In a ninth operation (not shown) of the method 500, the additional feed-based information is displayed to the first player through an additional user interface of the online game.

Storing Game-Related Data

A database may store any data relating to game play within a game networking system 108.2. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 108.2 may determine the player's friend preferences based on player attributes that the player's first-degree friends have in common, and may store these player attributes as friend preferences in the player profile. Furthermore, the game networking system 108.2 may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (e.g., a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges that the player cooperates on with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player and/or the player's virtual environment.

Example Game Systems, Social Networks, and Social Graphs

In a multiplayer game, players 102 control player characters (PCs), a game engine 305 controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine 305 may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine 305 may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player 102 (or a group of more than one players), the game engine 305 may take into account the state of the player character (or group of PCs) that is playing, but also the state of one or more PCs of offline/inactive players who are connected to the current player (or PC, or group of PCs) through the game social graph 200 but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player 102 may only have first-degree friends on the player's team. In other embodiments, a player may also have second-degree and higher degree friends on the player's team. To resolve the game event, in some embodiments the game engine 305 may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A player 102 may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and control the game's progress via the client device 104 (e.g., by inputting commands to the game at the client device 104). The client device 104 can display the game interface, receive inputs from the player 102, transmit user inputs or other events to the game engine 305, and receive instructions from the game engine 305. The game engine 305 can be executed on any suitable system (such as, for example, the client device 104, the social networking system 108.1, the game networking system 108.2, or the communication system 108.3). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player 102 is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's game play. For example, a first player may be associated with a first game instance, but the first game instance may be accessed by all first-degree friends in the first player's social network 250.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine 305 interfaces with a social graph 200. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in a multiplayer game.

In some embodiments, the social graph 200 is managed by the game networking system 108.2, which is managed by the game operator. In other embodiments, the social graph is part of a social networking system 108.1 managed by a third party (e.g., Facebook, Friendster, Myspace). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in an online multiuser game system or social networking system 108.1. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within a multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. Friend $4_2$ 242 is a second-degree friend with Player 201 in Player 201's in-game social network 260. In some embodiments, a game engine can access in-game social network 260, out-of-game social network 250, or both.

In some embodiments, the connections in a player's in-game social network is formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

Figure 6:
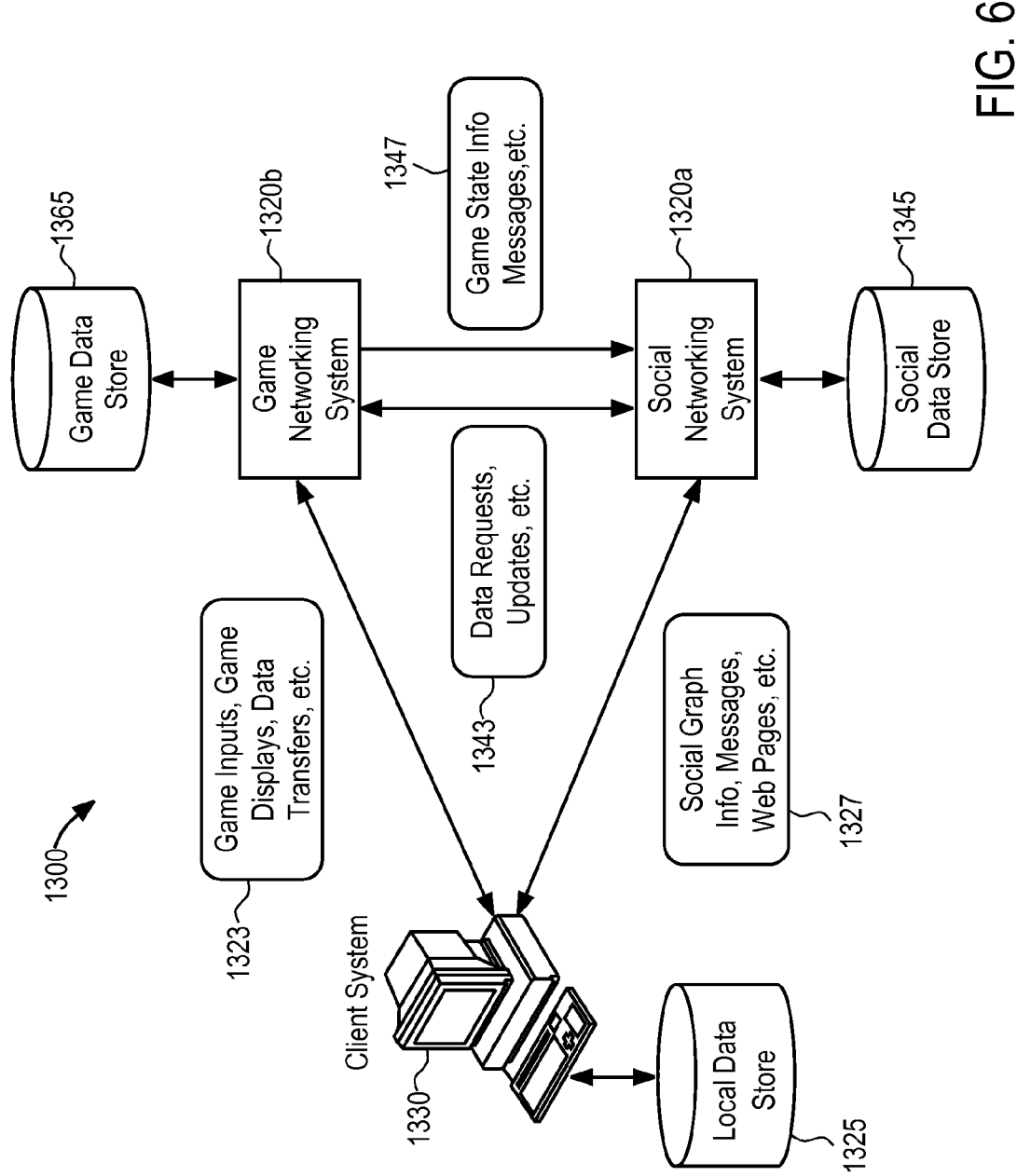
FIG. 6 is a diagrammatic representation of an example data flow between example components of the example system of FIG. 1, according to some embodiments.

FIG. 6 is a diagrammatic representation of an example data flow between example components of an example system 1300. One or more of the components of the example system 1300 may correspond to one or more of the components of the example system 100. In some embodiments, system 1300 includes a client system 1330, a social networking system 1320*a*, and a game networking system 1320*b*. The components of system 1300 can be connected to each other in any suitable configuration, using any suitable type of connection. The components may be connected directly or over any suitable network. The client system 1330, the social networking system 1320*a*, and the game networking system 1320*b* may have one or more corresponding data stores such as the local data store 1325, the social data store 1345, and the game data store 1365, respectively.

The client system 1330 may receive and transmit data 1323 to and from the game networking system 1320*b*. This data can include, for example, a web page, a message, a game input, a game display, a HTTP packet, a data request, transaction information, and other suitable data. At some other time, or at the same time, the game networking system 1320*b* may communicate data 1343, 1347 (e.g., game state information, game system account information, page info, messages, data requests, updates, etc.) with other networking systems, such as the social networking system 1320*a* (e.g., FACEBOOK, MYSPACE, etc.). The client system 1330 can also receive and transmit data 1327 to and from the social networking system 1320*a*. This data can include, for example, web pages, messages, social graph information, social network displays, HTTP packets, data requests, transaction information, updates, and other suitable data.

Communication between the client system 1330, the social networking system 1320*a*, and the game networking system 1320*b* can occur over any appropriate electronic communication medium or network using any suitable communications protocols. For example, the client system 1330, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 1320*b*, the BLOB containing the game state for the instance corresponding to the player may be transmitted to the client system 1330 for use by a client-side executed object to process. In some embodiments, the client-side executable is a FLASH™-based game, which can de-serialize the game state data in the BLOB. As a player plays the game, the game logic implemented at the client system 1330 maintains and modifies the various game state parameters locally. The client-side game logic may also batch game events, such as mouse clicks, and transmit these events to the game networking system 1320*b*. Game networking system 1320*b* may itself operate by retrieving a copy of the BLOB from a database or an intermediate memory cache (memcache) layer. The game networking system 1320*b* can also de-serialize the BLOB to resolve the game state parameters and execute its own game logic based on the events in the batch file of events transmitted by the client to synchronize the game state on the server side. The game networking system 1320*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 1330. For example, a client application downloaded to the client system 1330 may operate to serve a set of web pages to a player. As another example, a virtual game may be an animated or rendered game executable as a stand-alone application or within the context of a webpage or other structured document. In some embodiments, the virtual game is implemented using ADOBE™ FLASH™-based technologies. As an example, a game may be fully or partially implemented as a SWF object that is embedded in a web page and executable by a FLASH™ media player plug-in. In some embodiments, one or more described web pages is associated with or accessed by the social networking system 1320a. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 1330, either caused by an action of a game player or by the game logic itself, the client system 1330 may need to inform the game networking system 1320b of the update. For example, if the game is a farming game with a harvest mechanic (such as ZYNGA™ FARMVILLE™), an event can correspond to a player clicking on a parcel of land to harvest a crop. In such an instance, the application event data may identify an event or action (e.g., harvest) and an object in the game to which the event or action applies.

In some embodiments, one or more objects of a game may be represented as any one of an ADOBE™ FLASH™ object, MICROSOFT™ SILVERLIGHT™ object, HTML 5 object, etc. FLASH™ may manipulate vector and raster graphics, and supports bidirectional streaming of audio and video. "FLASH™" may mean the authoring environment, the player, or the application files. In some embodiments, the client system 1330 may include a FLASH™ client. The FLASH™ client may be configured to receive and run FLASH™ application or game object code from any suitable networking system (such as, for example, the social networking system 1320a or the game networking system 1320b). In some embodiments, the FLASH™ client is run in a browser client executed on the client system 1330. A player can interact with FLASH™ objects using the client system 1330 and the FLASH™ client. The FLASH™ objects can represent a variety of in-game objects. Thus, the player may perform various in-game actions on various in-game objects by making various changes and updates to the associated FLASH™ objects.

In some embodiments, in-game actions are initiated by clicking or similarly interacting with a FLASH™ object that represents a particular in-game object. For example, a player can interact with a FLASH™ object to use, move, rotate, delete, attack, shoot, or harvest an in-game object. This disclosure contemplates performing any suitable in-game action by interacting with any suitable FLASH™ object. In some embodiments, when the player makes a change to a FLASH™ object representing an in-game object, the client-executed game logic may update one or more game state parameters associated with the in-game object. To ensure synchronization between the FLASH™ object shown to the player at the client system 1330, the FLASH™ client may send the events that caused the game state changes to the in-game object to the game networking system 1320b. However, to expedite the processing and hence the speed of the overall gaming experience, the FLASH™ client may collect a batch of some number of events or updates into a batch file. The number of events or updates may be determined by the FLASH™ client dynamically or determined by the game networking system 1320b based on server loads or other factors. For example, client system 1330 may send a batch file to the game networking system 1320b whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the game play of a player or in response to the game engine (e.g., based on the game logic). In some embodiments, an application data update occurs when the value of a specific application datum is changed.

In some embodiments, when a player plays a virtual game on the client system 1330, the game networking system 1320b serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 1320b may retrieve the corresponding BLOB from the database to determine the most-recent values of the game-related data. In some embodiments, while a player is playing the virtual game, the game networking system 1320b also loads the corresponding BLOB into a memory cache so that the game system may have faster access to the BLOB and the game-related data contained therein.

Figure 7:
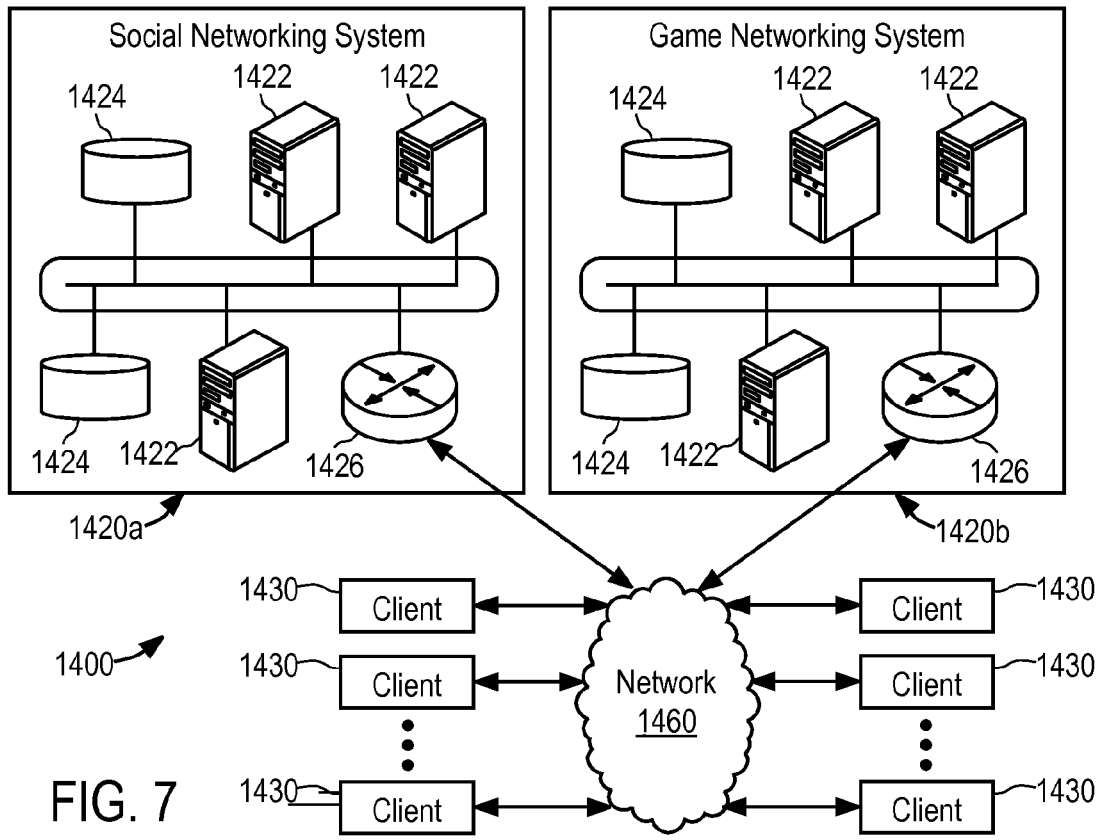
FIG. 7 is a schematic diagram showing an example network environment, in which various example embodiments may operate, according to some embodiments.

Various embodiments may operate in a wide area network environment, such as the Internet, including multiple network addressable systems. FIG. 7 is a schematic diagram showing an example network environment 1400, in which various example embodiments may operate. Network cloud 1460 generally represents one or more interconnected networks, over which the systems and hosts described herein can communicate. Network cloud 1460 may include packet-based wide area networks (such as the Internet), private networks, wireless networks, satellite networks, cellular networks, paging networks, and the like. As FIG. 7 illustrates, various embodiments may operate in a network environment 1400 comprising one or more networking systems, such as a social networking system 1420a, a game networking system 1420b, and one or more client systems 1430. The components of the social networking system 1420a and the game networking system 1420b operate analogously; as such, hereinafter they may be referred to simply as the networking system 1420. The client systems 1430 are operably connected to the network environment 1400 via a network service provider, a wireless carrier, or any other suitable means.

The networking system 1420 is a network addressable system that, in various example embodiments, comprises one or more physical servers 1422 and data stores 1424. The one or more physical servers 1422 are operably connected to computer network cloud 1460 via, by way of example, a set of routers and/or networking switches 1426. In an example embodiment, the functionality hosted by the one or more physical servers 1422 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), FLASH™, ActionScript, and the like.

The physical servers 1422 may host functionality directed to the operations of the networking system 1420. Hereinafter servers 1422 may be referred to as server 1422, although the server 1422 may include numerous servers hosting, for example, the networking system 1420, as well as other content distribution servers, data stores, and databases. Data store 1424 may store content and data relating to, and enabling, operation of, the networking system 1420 as digital data objects. A data object, in some embodiments, is an item of digital information typically stored or embodied in a data file, database, or record. Content objects may take many forms, including: text (e.g., ASCII, SGML, HTML), images (e.g., JPEG, TIF and GIF), graphics (vector-based or bitmap), audio, video (e.g., MPEG), or other multimedia, and combinations thereof. Content object data may also include executable code objects (e.g., games executable within a browser window or frame), podcasts, etc.

Logically, data store 1424 corresponds to one or more of a variety of separate and integrated databases, such as relational databases and object-oriented databases, that maintain information as an integrated collection of logically related records or files stored on one or more physical systems. Structurally, data store 1424 may generally include one or more of a large class of data storage and management systems. In some embodiments, data store 1424 may be implemented by any suitable physical system(s) including components, such as one or more database servers, mass storage media, media library systems, storage area networks, data storage clouds, and the like. In one example embodiment, data store 1424 includes one or more servers, databases (e.g., MySQL), and/or data warehouses. Data store 1424 may include data associated with different networking system 1420 users and/or client systems 1430.

The client system 1430 is generally a computer or computing device including functionality for communicating (e.g., remotely) over a computer network 106. The client system 1430 may be a desktop computer, laptop computer, personal digital assistant (PDA), in- or out-of-car navigation system, smart phone or other cellular or mobile phone, or mobile gaming device, among other suitable computing devices. Client system 1430 may execute one or more client applications, such as a Web browser.

When a user at a client system 1430 desires to view a particular webpage (hereinafter also referred to as target structured document) hosted by the networking system 1420, the user's web browser, or other document rendering engine or suitable client application, formulates and transmits a request to the networking system 1420. The request generally includes a URL or other document identifier as well as metadata or other information. By way of example, the request may include information identifying the user, a timestamp identifying when the request was transmitted, and/or location information identifying a geographic location of the user's client system 1430 or a logical network location of the user's client system 1430.

Although the example network environment 1400 described above and illustrated in FIG. 7 is described with respect to the social networking system 1420a and the game networking system 1420b, this disclosure encompasses any suitable network environment using any suitable systems. For example, a network environment may include online media systems, online reviewing systems, online search engines, online advertising systems, or any combination of two or more such systems.

Figure 8:
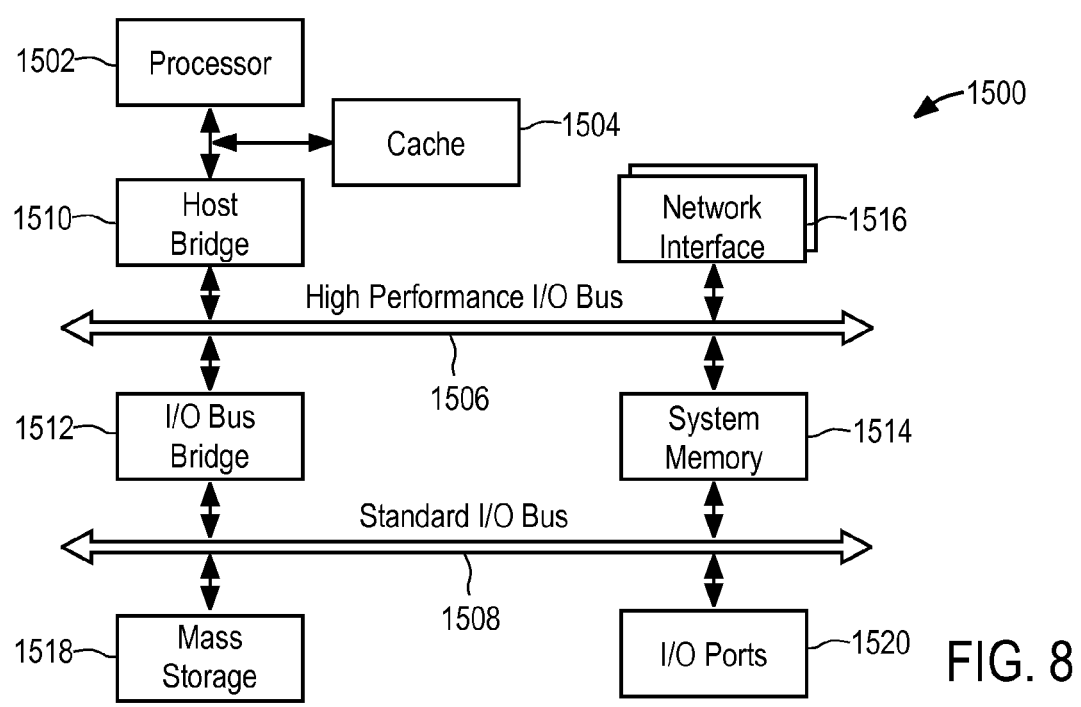
FIG. 8 is a block diagram illustrating an example computing system architecture, which may be used to implement one or more of the methodologies described herein, according to some embodiments.

FIG. 8 is a block diagram illustrating an example computing system architecture, which may be used to implement a server 1422 or a client system 1430. In one embodiment, the hardware system 1500 comprises a processor 1502, a cache memory 1504, and one or more executable modules and drivers, stored on a tangible computer-readable storage medium, directed to the functions described herein. Additionally, the hardware system 1500 may include a high performance input/output (I/O) bus 1506 and a standard I/O bus 1508. A host bridge 1510 may couple the processor 1502 to the high performance I/O bus 1506, whereas the I/O bus bridge 1512 couples the two buses 1506 and 1508 to each other. A system memory 1514 and one or more network/communication interfaces 1516 may couple to the bus 1506. The hardware system 1500 may further include video memory (not shown) and a display device coupled to the video memory. Mass storage 1518 and I/O ports 1520 may couple to the bus 1508. The hardware system 1500 may optionally include a keyboard, a pointing device, and a display device (not shown) coupled to the bus 1508. Collectively, these elements are intended to represent a broad category of computer hardware systems.

The elements of the hardware system 1500 are described in greater detail below. In particular, the network interface 1516 provides communication between the hardware system 1500 and any of a wide range of networks, such as an Ethernet (e.g., IEEE 802.3) network, a backplane, etc. The mass storage 1518 provides permanent storage for the data and programming instructions to perform the above-described functions implemented in servers 1422 of FIG. 7, whereas system memory 1514 (e.g., DRAM) provides temporary storage for the data and programming instructions when executed by the processor 1502. I/O ports 1520 are one or more serial and/or parallel communication ports that provide communication between additional peripheral devices, which may be coupled to the hardware system 1500.

The hardware system 1500 may include a variety of system architectures and various components of the hardware system 1500 may be rearranged. For example, cache memory 1504 may be on-chip with the processor 1502. Alternatively, the cache memory 1504 and the processor 1502 may be packed together as a "processor module," with processor 1502 being referred to as the "processor core." Furthermore, certain embodiments of the present disclosure may neither require nor include all of the above components. For example, the peripheral devices shown coupled to the standard I/O bus 1508 may couple to the high performance I/O bus 1506. In addition, in some embodiments, only a single bus may exist, with the components of the hardware system 1500 being coupled to the single bus. Furthermore, the hardware system 1500 may include additional components, such as additional processors, storage devices, or memories.

An operating system manages and controls the operation of the hardware system 1500, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
   receiving a plurality of player feeds in a game networking system that includes an online game;
   accessing a feed-display specification for displaying information from the player feeds in the game networking system, the feed-display specification including criteria for identifying portions of the player feeds related to aspects of the online game;
   accessing a first player profile for a first player in the online game, the first player profile identifying one or more characteristics of the first player, and the feed-display specification criteria relating an identity of the first player to one or more identities of players corresponding to the player feeds;
   using the first player profile with the feed-display specification to determine, with at least one processor, a first display profile for displaying information based on selected portions of the player feeds, the first display profile indicating the selected portions of the player feeds by using the one or more characteristics of the first player to identify the selected portions; and
   using the first display profile in combination with the player feeds to generate feed-based information for the first player.

2. The method of claim 1, wherein receiving the player feeds includes accessing network addresses for real-time streams that include communications from players in the game networking system.

3. The method of claim 1, wherein the feed-based information includes communications directed to a real-time proposal between the first player and another player in a game instance of the online game, the feed-display specification criteria being used to identify communications directed to real-time proposals between players in the game instance.

4. The method of claim 1, wherein the feed-based information includes a helper log that identifies help supplied between the first player and another player, the feed-display specification criteria being used to identify help supplied between players in the online game.

5. The method of claim 1, wherein the feed-based information includes chat communications between the first player and another player, the feed-display specification criteria being used to identify chat communications between players in the online game.

6. The method of claim 1, wherein the feed-based information is generated by using the first display profile in combination with the player feeds that correspond to a specified game instance of the online game.

7. The method of claim 1, further comprising:
   displaying the feed-based information to the first player through a user interface of the online game, the user interface being enabled by communications with a website of the game networking system.

8. The method of claim 1, further comprising:
   receiving a display request from the first player to provide additional feed-based information that corresponds to a game instance of the online game; and
   generating the additional feed-based information for the first player by using the first display profile and the display request to access the player feeds corresponding to the game instance.

9. A non-transitory computer-readable storage medium that stores a computer program including instructions that, when executed by one or more processors, cause the one or more processors to perform operations comprising:
   receiving a plurality of player feeds in a game networking system that includes an online game;
   accessing a feed-display specification for displaying information from the player feeds in the game networking system, the feed-display specification including criteria for identifying portions of the player feeds related to aspects of the online game;
   accessing a first player profile for a first player in the online game, the first player profile identifying one or more characteristics of the first player, and the feed-display specification criteria relating an identity of the first player to one or more identities of players corresponding to the player feeds;
   using the first player profile with the feed-display specification to determine a first display profile for displaying information based on selected portions of the player feeds, the first display profile indicating the selected portions of the player feeds by using the one or more characteristics of the first player to identify the selected portions; and
   using the first display profile in combination with the player feeds to generate feed-based information for the first player.

10. The non-transitory computer-readable storage medium of claim 9, wherein receiving the player feeds includes accessing network addresses for real-time streams that include communications from players in the game networking system.

11. The non-transitory computer-readable storage medium of claim 9, wherein the feed-based information includes communications directed to a real-time proposal between the first player and another player in a game instance of the online game, the feed-display specification criteria being used to identify communications directed to real-time proposals between players in the game instance.

12. The non-transitory computer-readable storage medium of claim 9, wherein the feed-based information includes a helper log that identifies help supplied between the first player and another player, the feed-display specification criteria being used to identify help supplied between players in the online game.

13. The non-transitory computer-readable storage medium of claim 9, wherein the feed-based information includes chat communications between the first player and another player, the feed-display specification criteria being used to identify chat communications between players in the online game.

14. The non-transitory computer-readable storage medium of claim 9, wherein the feed-based information is generated by using the first display profile in combination with the player feeds that correspond to a specified game instance of the online game.

15. The non-transitory computer-readable storage medium of claim 9, wherein the computer program further includes instructions that, when executed by the one or more processors, cause the one or more processors to perform operations comprising:
 displaying the feed-based information to the first player through a user interface of the online game, the user interface being enabled by communications with a website of the game networking system.

16. The non-transitory computer-readable storage medium of claim 9, wherein the computer program further includes instructions that, when executed by the one or more processors, cause the one or more processors to perform operations comprising:
 receiving a display request from the first player to provide additional feed-based information that corresponds to a game instance of the online game; and
 generating the additional feed-based information for the first player by using the first display profile and the display request to access the player feeds corresponding to the game instance.

17. An apparatus comprising at least one computer that performs operations for computer-implemented modules including:
 a player-feed module configured to receive a plurality of player feeds in a game networking system that includes an online game;
 a feed-display specification module configured to access a feed-display specification for displaying information from the player feeds in the game networking system, the feed-display specification including criteria for identifying portions of the player feeds related to aspects of the online game
 a player-profile module configured to access a first player profile for a first player in the online game, the first player profile identifying one or more characteristics of the first player, and the feed-display specification criteria relating an identity of the first player to one or more identities of players corresponding to the player feeds;
 a display-profile module configured to use the first player profile with the feed-display specification to determine a first display profile for displaying information based on selected portions of the player feeds, the first display profile indicating the selected portions of the player feeds by using the one or more characteristics of the first player to identify the selected portions; and
 a feed-based information module configured to use the first display profile in combination with the player feeds to generate feed-based information for the first player.

18. The apparatus of claim 17, wherein the feed-based information is generated by using the first display profile in combination with the player feeds that correspond to a specified game instance of the online game.

19. The apparatus of claim 17, wherein the feed-based information includes chat communications between the first player and another player, the feed-display specification criteria being used to identify chat communications between players in the online game.

20. The apparatus of claim 17, wherein the feed-based information module is further configured to display the feed-based information to the first player through a user interface of the online game, the user interface being enabled by communications with a website of the game networking system.

* * * * *